United States Patent
Davis et al.

(10) Patent No.: US 7,620,904 B1
(45) Date of Patent: Nov. 17, 2009

(54) ON DEMAND IDENTIFIER AND GEOMETRY PIECE ASSOCIATION IN COMPUTER AIDED DESIGN (CAD) ENVIRONMENT

(75) Inventors: Kenneth L. Davis, San Diego, CA (US); Anthony L. McCarty, Poway, CA (US)

(73) Assignee: Autodesk, Inc., San Rafael, CA (US)

( * ) Notice: Subject to any disclaimer, the term of this patent is extended or adjusted under 35 U.S.C. 154(b) by 379 days.

(21) Appl. No.: 10/177,819

(22) Filed: Jun. 21, 2002

(51) Int. Cl.
G06F 3/048 (2006.01)
G06F 17/50 (2006.01)

(52) U.S. Cl. .................. 715/764; 715/860; 715/964; 703/1; 345/676; 700/182

(58) Field of Classification Search ............... 715/769, 715/964, 805, 711, 799, 823, 860, 764; 700/182; 703/1; 345/676
See application file for complete search history.

(56) References Cited

U.S. PATENT DOCUMENTS

| | | | |
|---|---|---|---|
| 4,663,616 A * | 5/1987 | Christensen | 345/681 |
| 4,843,569 A | 6/1989 | Sawada et al. | |
| 4,951,227 A | 8/1990 | Todd | |
| 5,237,647 A | 8/1993 | Roberts et al. | |
| 5,386,504 A | 1/1995 | Yoda et al. | |
| 5,526,478 A * | 6/1996 | Russell et al. | 715/512 |
| 5,559,707 A | 9/1996 | Delorme et al. | |
| 5,617,524 A | 4/1997 | Dao et al. | |
| 5,625,827 A | 4/1997 | Krause et al. | |
| 5,630,041 A * | 5/1997 | Mills et al. | 345/441 |
| 5,724,072 A | 3/1998 | Freeman et al. | |
| 5,745,761 A | 4/1998 | Celi, Jr. et al. | |
| 5,774,720 A | 6/1998 | Borgeendale et al. | |
| 5,831,633 A | 11/1998 | Van Roy | |
| 5,835,693 A | 11/1998 | Lynch et al. | |
| 5,845,288 A | 12/1998 | Syeda-Mahmood | |
| 5,862,379 A * | 1/1999 | Rubin et al. | 717/109 |

(Continued)

FOREIGN PATENT DOCUMENTS

JP 60015777 A * 1/1985

OTHER PUBLICATIONS

Vivier et al., "Annotation: an A1 Approach to Engineering Drawing Annotation" ACM SIGART, Mar. 1988, pp. 447-455.

(Continued)

*Primary Examiner*—Kieu Vu
*Assistant Examiner*—Blaine T. Basom
(74) *Attorney, Agent, or Firm*—Fish & Richardson P.C.

(57) ABSTRACT

The invention includes computer instructions that operate to receive an indication of an association between an identifier and a geometry piece of a mechanical design. The association is stored in response to the received indication. The instructions further operate to determine if at least one of the identifier and the geometry piece is selected. Upon determining that at least one of the identifier and the geometry piece is selected, the instructions operate to automatically generate and display a leader between the geometry piece and the identifier to visually denote the association between the identifier and the geometry piece. As a result, an improved way of generating and maintaining associations between identifiers and geometry pieces of a mechanical design, including automatic modification of leader termination on the mechanical design, is facilitated.

18 Claims, 7 Drawing Sheets

U.S. PATENT DOCUMENTS

| | | | |
|---|---|---|---|
| 6,047,233 A * | 4/2000 | Salvatore et al. | 701/120 |
| 6,184,860 B1 * | 2/2001 | Yamakawa | 715/823 |
| 6,243,102 B1 | 6/2001 | Ruff et al. | |
| 6,289,396 B1 | 9/2001 | Keller et al. | |
| 6,356,284 B1 * | 3/2002 | Manduley et al. | 715/779 |
| 6,366,293 B1 | 4/2002 | Hamilton et al. | |
| 6,496,195 B1 | 12/2002 | Gill et al. | |
| 6,594,696 B1 * | 7/2003 | Walker et al. | 709/223 |
| 6,611,725 B1 | 8/2003 | Harrison et al. | |
| 6,768,928 B1 | 7/2004 | Nagasawa et al. | |
| 6,778,275 B2 | 8/2004 | Bowes | |
| 6,810,401 B1 | 10/2004 | Thompson et al. | |
| 6,950,113 B2 | 9/2005 | Gill et al. | |
| 7,117,199 B2 | 10/2006 | Frank et al. | |

OTHER PUBLICATIONS

Hutton et al., "A Strategy for On-Line Interpretation of Sketched Engineering Drawings", IEEE, 1997, pp. 771-775.

Krause et al., "Processing of CAD-Data —Conversion, Verification and Repair", *Solid Modeling*, 1997, pp. 248-254.

Nousch et al., "CAD on the World Wide Web: Virtual Assembly of Furniture with BEAVER", SIGGRAPH, ACM Feb. 1999, pp. 113-119.

http://www/ugsolutions.com/products/unigraphics/cad/drafting, printed May 1, 2000, 2 pgs.

Bidarra et al. "A Collaborative Framework for Integrated Part and Assembly Modeling", Proceedings of the Fourth Symposium on Virtual Reality Modeling Language, ACM, Jun. 2002, pp. 389-400.

Finkelstein, "AutoCAD 2002 Bible, Part II" 2002, pp. 400-406.

* cited by examiner

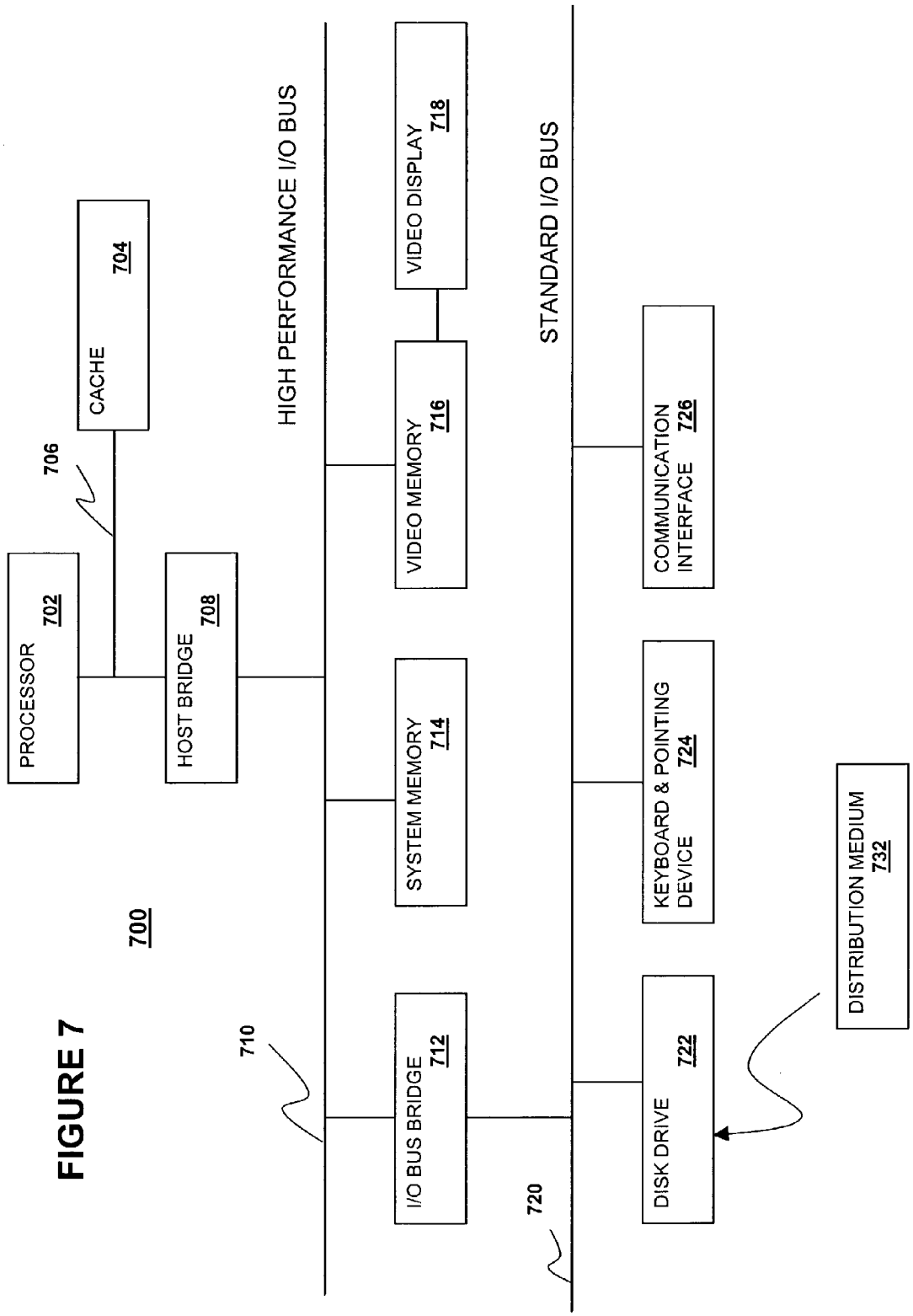

ously manufactured and put together may now be detected because the parts may be "virtually" manufactured and put together. Furthermore, having the assemblies in the CAD environment has facilitated reduction of the need to produce numerous drawings to convey information regarding the assemblies and their components. Instead, information may now be conveyed on-screen through a CAD display showing the entire assembly or subassemblies of interest.
ON DEMAND IDENTIFIER AND GEOMETRY PIECE ASSOCIATION IN COMPUTER AIDED DESIGN (CAD) ENVIRONMENT

FIELD OF INVENTION

The present invention relates to the field of computer aided design (CAD). More specifically, the present invention relates to computer assistance to a designer in generating and maintaining associations between identifiers and geometry pieces of a mechanical design.

BACKGROUND OF THE INVENTION

Advances in computer aided design (CAD) modeling have facilitated the employment of geometry pieces to represent solid models. Accordingly, full assemblies of CAD models may be designed and built as a number of geometry pieces within the CAD environment. These assemblies may be as simple as having a couple of components, such as a nut and bolt combination. More commonly, assemblies involve numerous components that are put together in various manners. For example, an entire vehicle may be designed and built within the CAD environment made up of an assembly of numerous components. The numerous components may be detailed as to include individual nuts and bolts. This ability to design and build complex assemblies in the CAD environment has improved the efficiency of design and manufacturing. Accordingly, issues that were not detectable until the components were actually manufactured and put together may now be detected because the parts may be "virtually" manufactured and put together. Furthermore, having the assemblies in the CAD environment has facilitated reduction of the need to produce numerous drawings to convey information regarding the assemblies and their components. Instead, information may now be conveyed on-screen through a CAD display showing the entire assembly or subassemblies of interest.

As the assemblies become more complex, providing on-screen information regarding these complex assemblies have become more difficult. For example, a designer may need to provide some information regarding a particular geometry piece making up a component in an assembly, where the information may be an identifier in the form of text. However, because the number of components may be numerous, placing information in proximity to the particular geometry piece may be impracticable (i.e., text may overlap each other and may obscure other geometry pieces). Additionally, placing information around the assembly may cause leader lines to cross each other, which may be confusing. Moreover, having information around the assembly without having leader lines pointing to particular geometry pieces may not convey the information that the designer is trying to convey (i.e., a viewer may not be able to distinguish which particular geometry piece has an association with which text).

Thus, an improved approach for generating and maintaining associations between identifiers and geometry pieces of a mechanical design is desired.

BRIEF DESCRIPTION OF DRAWINGS

The present invention will be described by way of exemplary embodiments, but not limitations, illustrated in the accompanying drawings in which like references denote similar elements, and in which:

FIG. 7 illustrates one embodiment of a computer system suitable to be programmed with the mechanical design application of the invention.

DETAILED DESCRIPTION OF THE INVENTION

Figure 1:
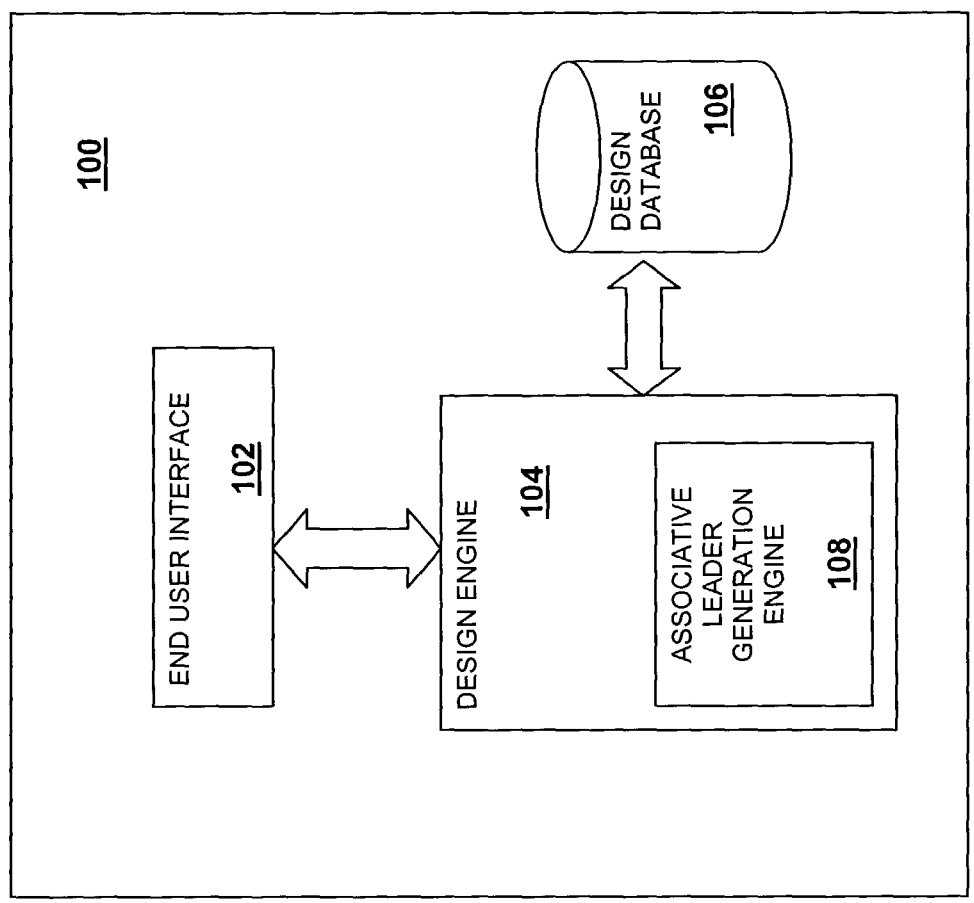
FIG. 1 illustrates a block diagram of one embodiment of a mechanical design application for facilitating generation and maintenance of associations between identifiers and geometry pieces of a mechanical design, in accordance with the present invention.

In the following description, various aspects of the invention will be described. However, it will be apparent to those skilled in the art that the invention may be practiced with only some or all described aspects. For purposes of explanation, specific numbers, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system. The term computer system includes general purpose as well as special purpose data processing machines, systems, and the like, that are standalone, adjunct or embedded.

Various operations will be described as multiple discrete steps in turn, in a manner that is most helpful in understanding the invention. However, the order of description should not be construed as to imply that these operations are necessarily order dependent. In particular, these operations need not be performed in the order of presentation.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

For the purposes of describing the invention, in a computer aided design (CAD) environment, a geometry piece may be a 2-D geometry piece, such as, but not limited to, a line, arc, point, and so forth. Additionally, the geometry piece may be a 3-D geometry piece having solid properties, such as, but not limited to, volume, weight, and density.

In the CAD environment, an identifier may be a CAD entity that conveys some form of information. For example, an identifier may be a number, or any other type of textual information encapsulated in a "balloon" or other geometric shapes.

In various embodiments of the invention, generating and maintaining associations between identifiers and geometry pieces of a mechanical design is facilitated. This and other advantages will be evident from the disclosure.

FIG. 1 illustrates a block diagram of one embodiment of a mechanical design application for facilitating generation and maintenance of associations between identifiers and geometry pieces of a mechanical design, in accordance with the present invention. In FIG. 1, mechanical design application 100 includes an end user interface 102, a design engine 104, and a design database 106. The design engine 104 includes, in particular, associative leader generation engine 108, in accordance with the invention. Together, the elements cooperate to generate and maintain associations between identifiers and geometry pieces of a mechanical design on demand, in accordance with one embodiment of the invention.

In FIG. 1, the end user interface 102 operates to graphically display and receive input of an association of a geometry piece with an identifier under the control of the design engine 104. Under the control of the design engine 104, the design database 106 operates to store information regarding the association of the geometry piece with the identifier. Once the information regarding the association of the geometry piece with the identifier has been stored, and upon receiving an indication that the identifier has been selected, the associative leader generation engine 108 automatically utilizes various data to automatically generate and display a visual representation of the association between the identifier and the geometry piece. In one embodiment, the visual representation is a graphical representation in the form of e.g., a leader connecting the identifier and the geometry piece. In alternate embodiments, other 2-D or 3-D graphical representations or even other non-graphical visual representations may be employed to convey an association.

Except for the teachings of the present invention incorporated in the associative leader generation engine 108, the mechanical design application 100 is intended to represent a broad range of CAD software known in the art, including but not limited to Autodesk Inventor™, available from Autodesk, Inc. of San Rafael, Calif.

Figure 2:
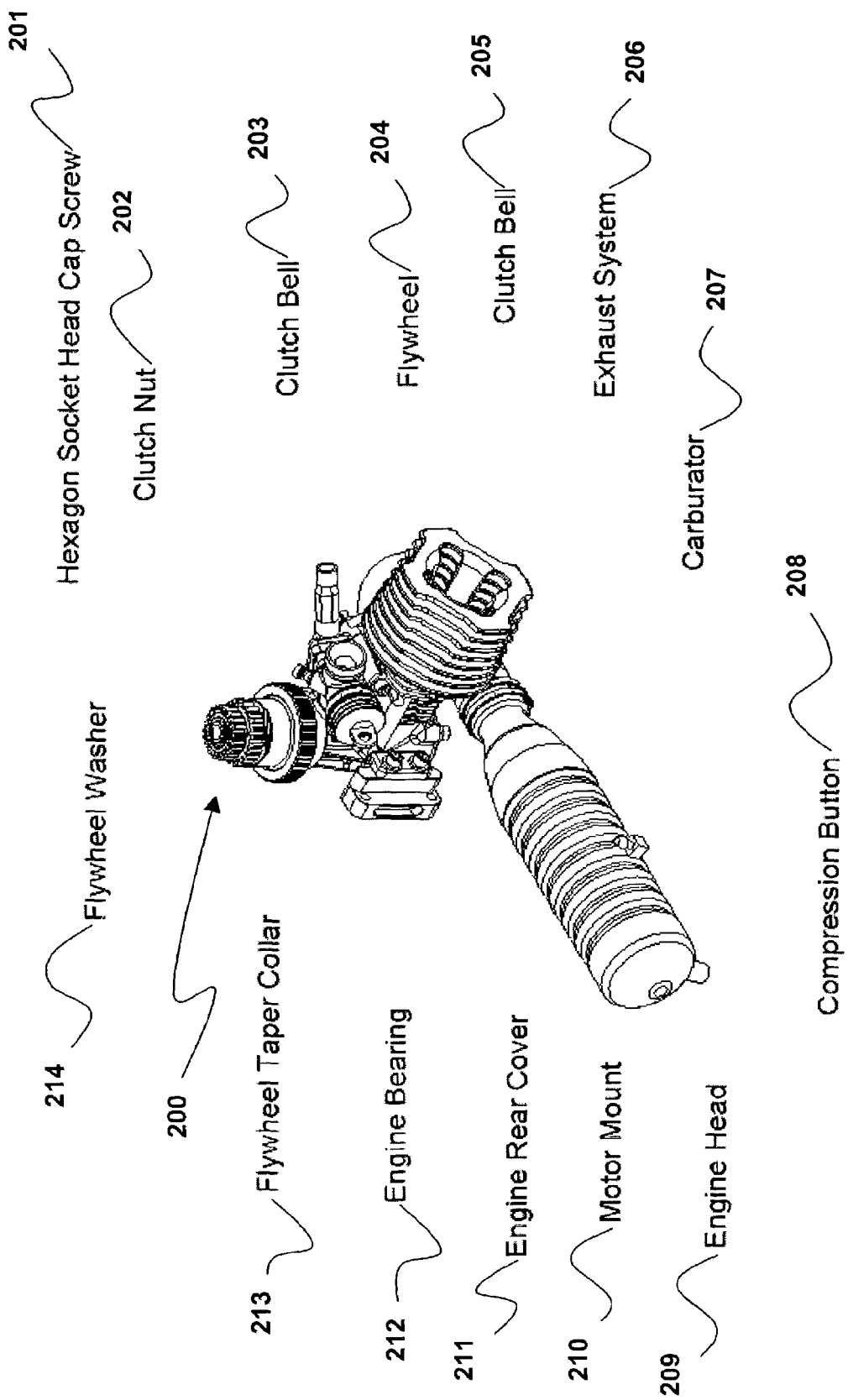
FIG. 2 illustrates an assembly of geometry pieces with identifiers associated with the geometry pieces, wherein associations between identifiers and the geometry pieces are automatically generated and maintained on demand, in accordance with one embodiment of the present invention.

FIG. 2 illustrates an assembly of geometry pieces with identifiers associated with the geometry pieces, wherein associations between identifiers and the geometry pieces are automatically generated and maintained on demand, in accordance with one embodiment of the present invention. Illustrated in FIG. 2, is an assembly 200 made up of numerous geometry pieces. Additionally, in proximity to the assembly 200 are a number of identifiers 201-214. The identifiers 201-214 provide information regarding the various corresponding geometry pieces that make up the assembly 200. For example, each identifier may be a description of a corresponding geometry piece that makes up the assembly 200.

As shown in FIG. 2, the identifiers 201-214 are displayed in proximity to the assembly 200. However, visual representations of associations (e.g. in the form of leaders) between the identifiers 201-214 and their respective geometry pieces are not normally displayed, except on demand. As will be described in further detail below, the graphical representations of the associations, in the form of leaders, will be displayed in response to predetermined events, in accordance with one embodiment of the present invention. Additionally, as alluded to earlier, a user (not shown) may have previously provided information regarding associations of the identifiers 201-214 with their respective geometry pieces.

The information regarding the associations of the identifiers 201-214 with their respective geometry pieces may be provided in any type of association method such as, but not limited to, the user inputting an identifier and selecting a geometry piece that is to have an association with the identifier, where the selection may be by menu input. This information may then be stored in the design database 106 (shown in FIG. 1). As will be described in further detail below, the stored information regarding the associations of the identifiers 201-214 with their respective geometry pieces may be utilized to generate e.g. a leader between the identifiers 201-214 and the geometry pieces to associate the two entities, in accordance with one embodiment of the present invention. As a result, in the illustrated embodiment of FIG. 2, numerous identifiers may be advantageously associated with geometry pieces and placed in proximity to or otherwise away from the geometry pieces, while not obscuring any of the geometry pieces. That is, an identifier may be placed randomly on the display, and does not necessarily need to be in proximity to the geometry piece associated with the identifier. A graphical representation such as a leader is generated on demand to convey association of the two entities.

It should be appreciated by those skilled in the art that the assembly 200 may include many more identifiers than the ones shown because the number of geometry pieces that may make up the assembly 200 may be very numerous. However, for ease of understanding the present invention, a limited number of identifiers will be utilized. Nevertheless, they sufficiently illustrate the present invention. Additionally, the identifiers 201-214 are shown in proximity to the assembly 200. However, in accordance with the teachings of the present invention, the identifiers 201-214 may be advantageously placed in any location on the display (in particular, in locations so they do not obstruct viewing of the geometry pieces).

Figure 3:
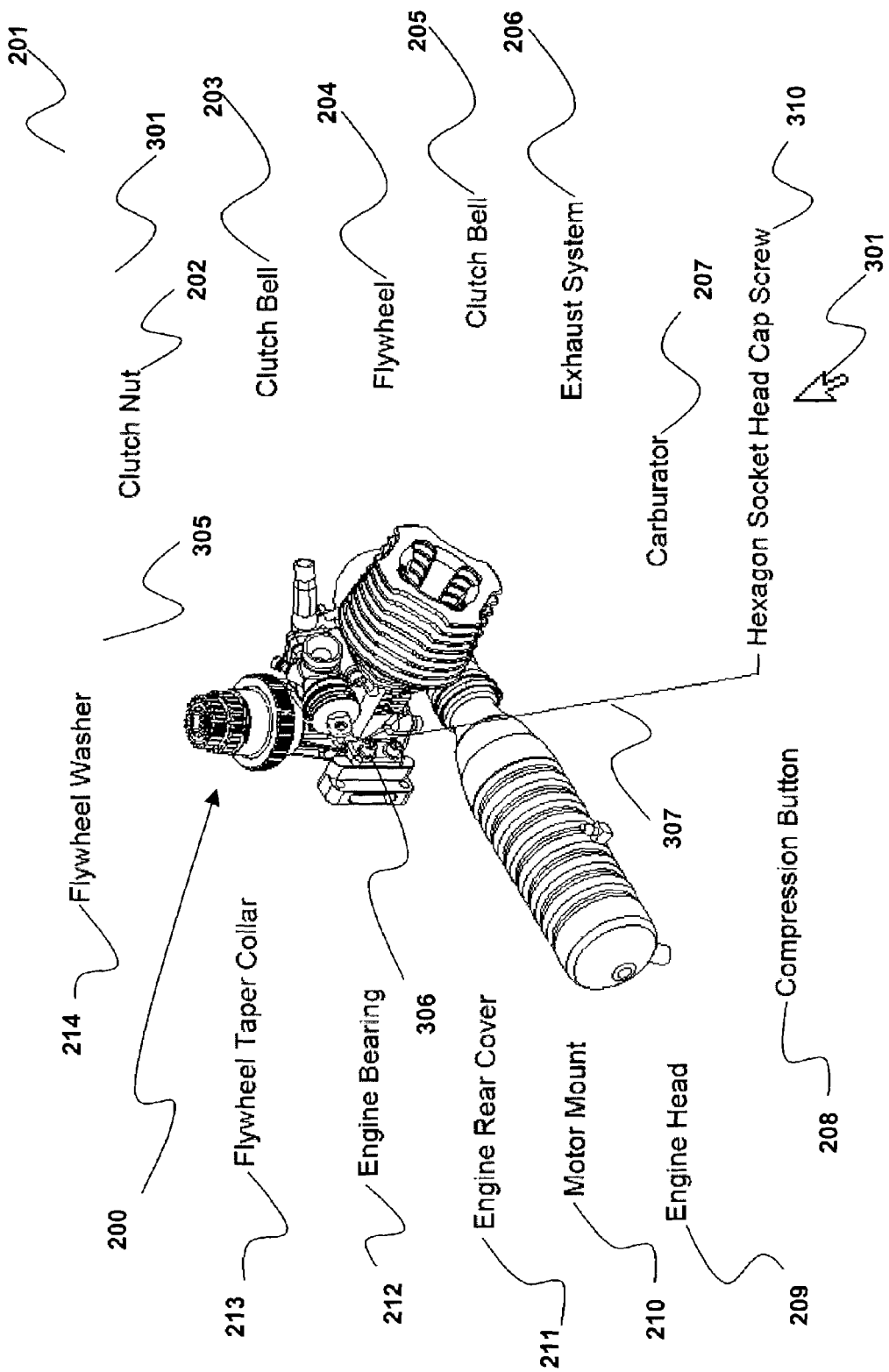
FIG. 3 illustrates automatic associative graphical representation generation (or more specifically, a leader) between an identifier and a geometry piece, in accordance with one embodiment of the present invention.

FIG. 3 illustrates automatic associative graphical representation generation (or more specifically, a leader) between an identifier and a geometry piece, in accordance with one embodiment of the present invention. Illustrated in FIG. 3 is the assembly 200 having identifiers 201-214 displayed in proximity to the assembly 200. As shown in FIG. 3, an indication is received that one identifier 201, "Hexagon Socket Head Cap Screw", has been selected. The indication may be in the form of the user utilizing a cursor 301 to select the identifier 201. Additionally, the selection of the identifier may be in the form of receiving an indication of a cursor being in a predetermined proximity to the identifier, receiving an indication of a click and drag operation of the identifier, and so forth. The size of the predetermined proximity is application dependent, and may be any amount depending on the desired sensitivity. Preferably, it is customizable by the user.

In response to the received indication, a leader 305 is automatically generated and displayed indicating an association between the identifier 201 and a geometry piece 306 of the assembly, for example, a CAD geometry piece in the form of a hexagon socket head cap screw. The leader 305 may be automatically generated by determining a closest approach (i.e., closest distance) between the identifier 201 and the geometry piece 306, where the closest approach may be determined for either 2D or 3D space utilizing "critical" vertices of the identifier 201 and the geometry piece 306.

In one embodiment, the leader 305 is automatically generated and displayed, based at least upon other entities between the geometry piece 306 and the identifier 201. That is, leader 305 may go around other geometry pieces and/or identifier that may be between the geometry piece 306 and the identifier 201 to advantageously avoid obscuring other geometry pieces and/or identifiers. In order to go around a geometry piece or an identifier, the associative leader generation engine 108 may first determine the closest approach between the geometry piece 306 and the identifier 201. However, upon determining the closest approach, the associative leader generation engine 108 further determines if there are any entities on the closest approach. If it is determined that there are one or more entities along the closest approach, the associative leader generation engine 108 may adjust the closest approach leader (which by definition is linear) into a non-liner form, e.g. a 2D multi-segmented line, a 2D curve, a 2D spline, a 3D arrow, or a 3D tube, to go around the entities. "Navigating" around the entities along the closest approach may be performed in accordance with a predetermined "minimum" boundary. The size of the predetermined "minimum" boundary may be application dependant, and may be any amount depending on the desired "maximum" deviation from the closest approach. Preferably, it is customizable by the user.

As will be described in further detail below, in one embodiment, the leader may terminate at locations based at least upon a geometric property of the geometry piece. That is, the leader's termination location on the geometry piece may be determined based on one or more geometric properties of the geometry piece.

Once the leader 305 is automatically generated and displayed, the user may then select the identifier 201 again, and modify the identifier 201. The modification may be to move the re-selected identifier 201 to a new location as shown in the embodiment of FIG. 3.

In one embodiment, once the leader 305 has been generated and displayed, a modified leader 307 may be generated after the completion of the modification. Accordingly, once the identifier has been moved to a new location and un-selection of the identifier 201 is received, in response, the associative leader generation engine 108 (shown in FIG. 1) may automatically generate and display the modified identifier 310 with the modified leader 307.

In one embodiment, the leader 305, once generated, may be continuously displayed so long as the indication of the un-selection of the identifier 201 has not been received. Accordingly, once an un-selection of either the identifier 201 or the geometry piece of a visually associated identifier and geometry piece is received, the associative leader generation engine 108 (shown in FIG. 1) may "un-display" the visual association (i.e. the leader, in the "leader" embodiment). That is, for the "leader" embodiment, the leader is no longer displayed (i.e., visually hidden).

In one embodiment, an indication that the cursor 301 is placed in a predetermined proximity to the identifier 201 may be received, and in response, the leader 305 may be generated and displayed between the identifier 201 and a geometry piece 306 of the assembly 200. If the cursor 301 is moved outside the predetermined proximity of the identifier 201, the leader 305 may no longer be displayed. The predetermined proximity may be an interaction condition such as, but not limited to, a mouse-over condition.

Additionally, the leader 305 may be generated and displayed in response to receiving an indication of selection of the geometry piece 306. That is, once an association has been stored between an identifier and a geometry piece, the selection of either the geometry piece or the identifier generates and displays a leader between the geometry piece and the identifier.

As will be appreciated by those skilled in the art, generating and maintaining associations between identifiers and geometry pieces of a mechanical design in the above described manner results in a much less cluttered and substantially improved identification method.

Figure 4:
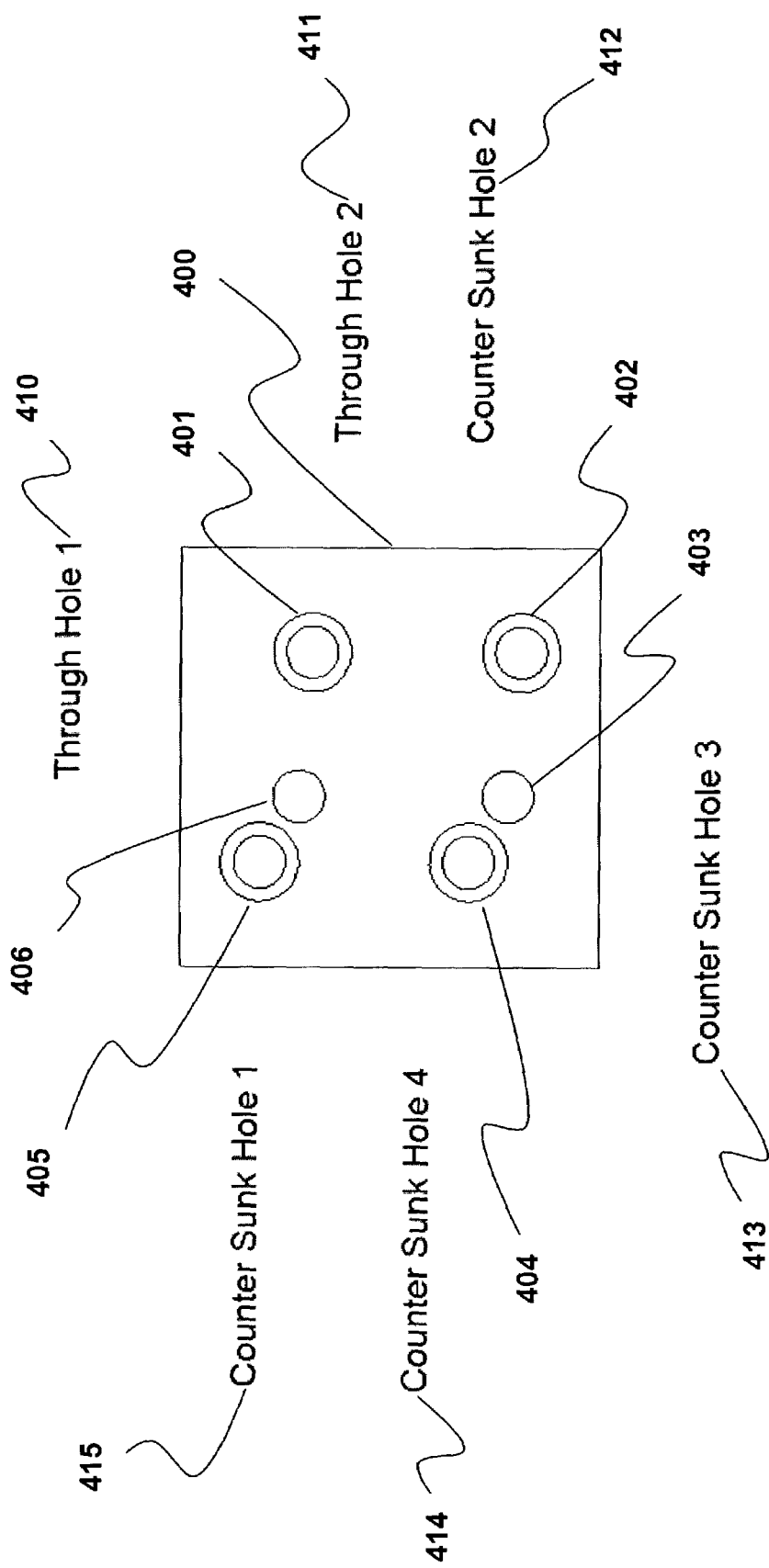
FIG. 4 illustrates a geometry piece of a mechanical design having features wherein identifiers associated with the features are generated and maintained, in accordance with an alternate embodiment of the present invention.

FIG. 4 illustrates a geometry piece of a mechanical design having features wherein identifiers associated with the features are generated and maintained, in accordance with an alternate embodiment of the present invention. Illustrated in FIG. 4 is a geometry piece 400 having a number of features 401-406. Additionally, a number of identifiers 410-415 are displayed in proximity to the geometry piece 400. As previously described, information regarding association of identifiers 410-415 with their respective features 401-406 may have been previously received and stored.

The identifiers 410-415 of FIG. 4 may be advantageously displayed in various locations because associations between identifiers 410-415 and their respective features 401-406 may be generated and maintained, in accordance with the teachings of the present invention.

Figure 5:
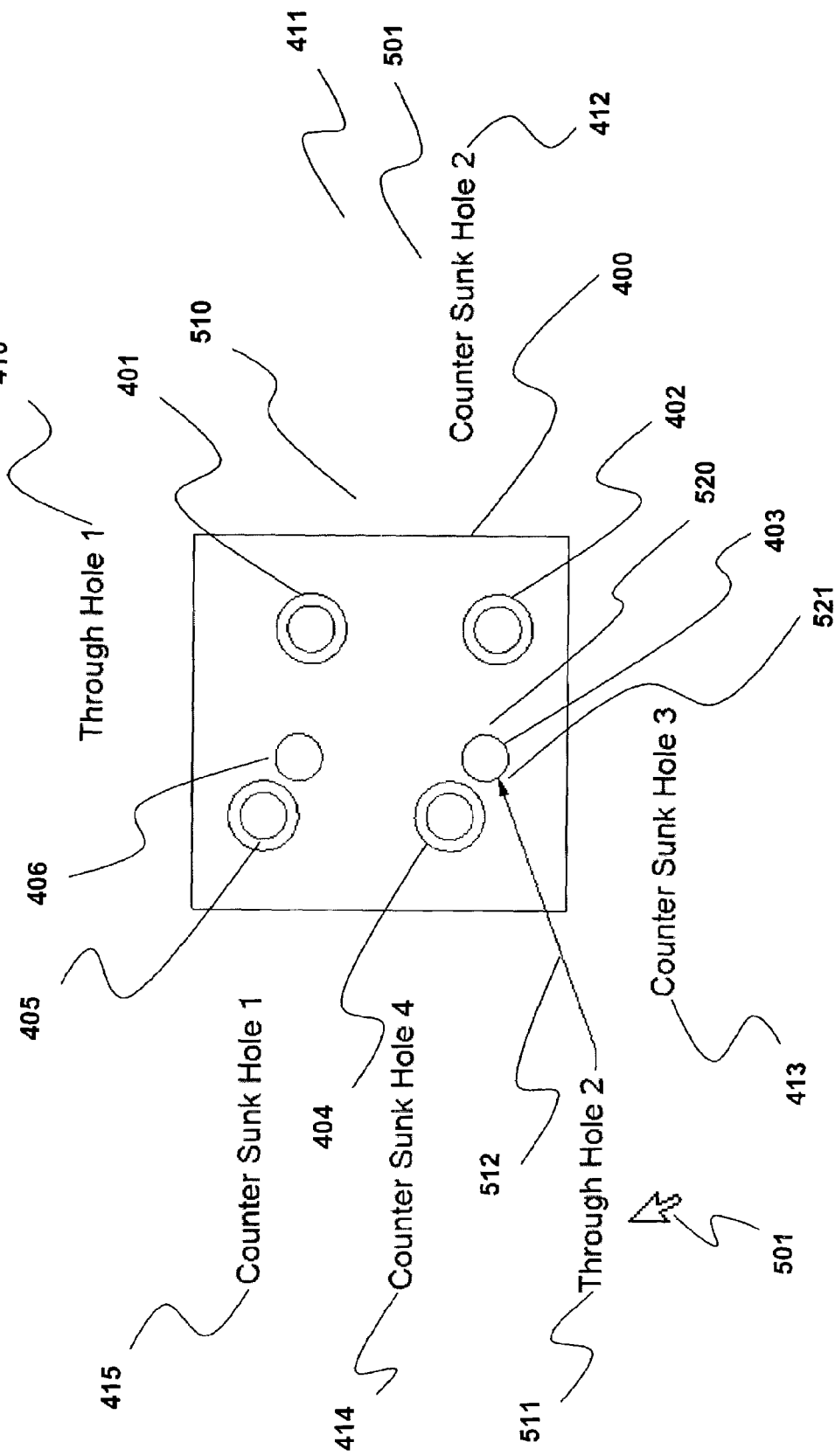
FIG. 5 illustrates automatic associative leader generation between an identifier and a feature of a geometry piece, in accordance with one embodiment of the present invention.

FIG. 5 illustrates automatic associative leader generation between an identifier and a feature of a geometry piece, in accordance with one embodiment of the present invention. Shown in FIG. 5 is the geometry piece 400 having features 401-406, and displayed in proximity to the geometry piece 400, are the identifiers 411-415.

Additionally, an indication is received that the identifier 411, "Through Hole 2", has been selected by the user. The received indication may be in the form of the user utilizing a cursor 501 and cursor selecting on the identifier 411. Alternatively, the received indication may be in the form of determining if the cursor 501 is within a predetermined proximity to the identifier 411. In response to the received indication, a leader 510 is generated and displayed between feature 403, one of two through hole features, and identifier 411, "Through Hole 2". The leader 510 provides a visual indication of an association between the identifier 411 and the feature 403.

As illustrated in FIG. 5 the selected identifier 411 is moved to a new location resulting in a modified identifier 511 and a modified leader 512. The modification may be facilitated by the user clicking and dragging the identifier 411 to its new location. As described previously, the leader 510 may be generated and displayed during the move (i.e., continuously receiving and indication that the identifier 411 has been selected). Accordingly, once the identifier 411 has been modified and un-selection is received, the associative leader generation engine 108 (shown in FIG. 1) automatically generates and displays the modified identifier 511 and the modified leader 512.

Alternatively, in one embodiment, the leader 510 may be continuously displayed as long as the indication of un-selection of either the identifier 411 or the corresponding geometry piece of a visually associated identifier and geometry piece has not been received. Accordingly, once the identifier or the geometry piece of a visually associated pair has been un-selected, the associative leader generation engine 108 (shown in FIG. 1) causes cessation of the display of the visual association (i.e. the leader, for the "leader" embodiment). The visual representation of the association is no longer displayed (i.e., visually hidden).

In the illustrated embodiment of FIG. 5, the generated and displayed leader 510 between the feature 403 and identifier 411 is shown terminating at a first location 520 on feature 403. Moreover, once the identifier 411 is modified (i.e., moved to its new location) resulting in the modified identifier 511, the modified leader 512 terminates at a second location 521. As illustrated, the second location 521 may be a location on the feature 403 being of a closest approach between the feature 403 and the modified identifier 511. As alluded to earlier, modification of a location of an identifier advantageously does not cross (i.e., obscure) a feature because a termination location of a leader on the feature may be automatically modified responsive to the modification of the location of the identifier.

In one embodiment, the leader's termination location 521 may be based at least upon a geometric property of the geometry piece. That is, the leader's termination location 521 may be determined in accordance with the geometric properties of the geometry piece. The leader's termination location 521 may be any location disposed on a geometric boundary of the geometry piece. Alternatively, the leader's termination location 521 may intersect with a geometric center of the geometry piece.

For the example illustrated embodiment of FIG. 5, the geometry piece 403 may have a geometric boundary of a circle. Alternatively, the geometric center may be a center of the circle. For the illustrated embodiment of FIG. 3, the geometry piece 306 may have a geometric boundary of faces representing a solid model. Alternatively, the geometric center may be a centroid of the geometry piece 306.

Furthermore, modification of a location of a geometry piece having an association with an identifier may also automatically modify a termination location of a leader on the geometry piece. That is, modification of either the geometry piece or the identifier may result in a modification of the termination location of the leader on the geometry piece to provide the closest approach between the feature 403 and the modified identifier, while not obscuring other geometry pieces or identifiers.

As a result, generating and maintaining associations between identifiers and geometry pieces of a mechanical design is facilitated, including automatic modification of leader termination on the geometry piece of the mechanical design.

Figure 6:
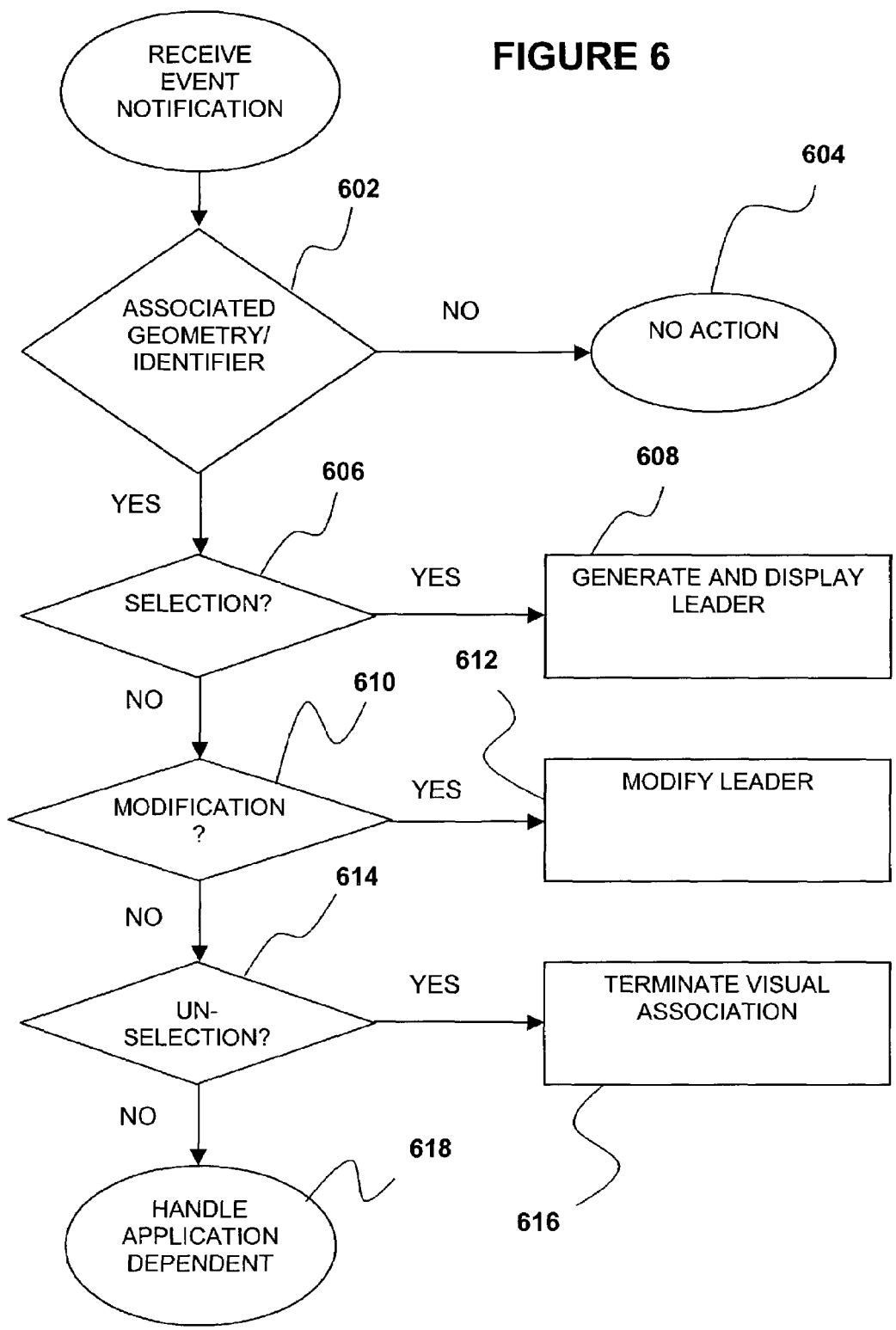
FIG. 6 illustrates the operational flow of the relevant aspects of leader generation engine for generating and maintaining associations between identifiers and geometry pieces of a mechanical design, in accordance with one embodiment of the present invention.

FIG. 6 illustrates the operational flow of the relevant aspects of "leader" generation engine 108 of FIG. 1 for generating and maintaining associations between identifiers and geometry pieces of a mechanical design, in accordance with one embodiment of the present invention. For the illustrated embodiment, associative leader generation engine 108 (shown in FIG. 1) is programmed in accordance with an even driven model (i.e., associative leader generation engine 108 is designed to be executed in a system environment where various event notification services are available from the operating system). One example of such an operating system suitable for practicing the invention is the Windows® operating system, available from Microsoft Corporation of Redmond, Wash. In alternate embodiments, associative leader generation engine 108 may be implemented in other programming approaches known in the art.

At operational block 605, the associative leader generation engine 108 determines if an event notification is related to a geometry piece having association with an identifier or vice versa. If it is determined that the received event notification is not related to associated geometry piece/identifier, the associative leader generation engine 108 takes no action, operational block 604. However, if an event notification is related to an associated geometry piece/identifier, the associative leader generation engine 108 further determines if the received event notification denotes an event of a selection of an associated identifier or geometry piece without the association being visually indicated, operational block 606.

If upon determining that the event notification is related to an associated identifier/geometry piece, it is further determined that the event notification denotes a selection of an associated identifier or geometry piece with the association not visually indicated, and accordingly, the associative leader generation engine 108 generates and displays a leader to represent the association between the geometry piece and the identifier, operational block 608. However, if upon determining that the event notification is related to an associated identifier/geometry piece, it is further determined that the event notification does not denote a selection of an associated identifier or a geometry piece, and accordingly, the associative leader generation engine 108 further determines if a modification of either the geometry piece or the identifier is received, operational block 610.

If it is determined that the event notification denotes a modification of the geometry piece, the associative leader generation engine 108 automatically modifies the leader based at least in part on the modification, operational block 612. However, if it is determined that the event notification does not denote a modification, for the embodiment, associative leader generation engine 108 further determines if the event notification denotes an un-selection of a visually associated identifier or the geometry piece, operational block 614.

If upon determining that the event notification is related to an associated identifier/geometry piece, it is further determined that the event notification denotes an un-selection of a visually associated identifier/geometric piece, in response, the associative leader generation engine 108 terminates visually associating the unselected identifier/geometric piece and its associated counterpart. In one embodiment, the associative leader generation engine 108 causes the display of the leader that visually associates the identifier and the geometric piece to cease (i.e. "hiding" the leader), operational block 616.

However, if upon determining that the event notification is related to an associated identifier/geometry piece, but the event notification does not denote "selection", nor "modification", and it is further determined that the event notification also does not denote an "un-selection" of a visual associated identifier/geometry piece, the process may be handled in an application dependent manner, operational block 618.

The selection of the identifier may be in the form of receiving an indication of the a cursor being in a predetermined proximity to the identifier, receiving an indication of a cursor click on the identifier, receiving an indication of a click and drag operation of the identifier, and so forth. The generated leader may originate from any point of the identifier and terminate at any location on the geometry piece. In one embodiment, if the geometry piece has been modified (i.e., by being moved to a new location), while the leader is being displayed, the leader generation engine 108 automatically relocates the leader, and terminates the leader at another location coincidence with the relocated geometry piece.

In one embodiment, if the identifier has been modified (e.g., by being moved to a new location), while the leader is being displayed, the leader generation engine 108 automatically relocates the leader, and terminates the leader at another location being of a closest approach between the geometry piece and the identifier.

As previously described, the selection of the geometry piece also results in a leader being generated and displayed, in accordance with the various embodiments of the present invention.

As a result, generating and maintaining associations between identifiers and geometry pieces of a mechanical design is facilitated.

FIG. 7 illustrates one embodiment of a computer system suitable to be programmed with the mechanical design application of the invention. As shown, for the illustrated embodiment, computer 700 includes processor 702, processor bus 706, high performance I/O bus 710 and standard I/O bus 720. Processor bus 706, and high performance I/O bus 710 are bridged by host bridge 708, whereas I/O buses 710 and 720 are bridged by I/O bus bridge 712. Coupled to processor bus 706 is cache 704. Coupled to high performance I/O bus 710 are system memory 714 and video memory 716, against which video display 718 is coupled. Coupled to standard I/O bus 720 are disk drive 722, keyboard and pointing device 724, and communication interface 726.

These elements perform their conventional functions known in the art. In particular, disk drive 722 and system memory 714 are used to store permanent and working copies of at least the relevant components of the mechanical design system incorporated with the teachings of the invention. The permanent copy may be pre-loaded into disk drive 722 in factory, loaded from distribution medium 732, or down loaded from a remote distribution source (not shown). Distribution medium 732 may be a tape, a CD, and DVD or other storage medium of the like. The constitutions of these elements are known. Any one of number implementations of these elements known in the art may be used to form computer system 700.

In general, those skilled in the art will recognize that the invention is not limited by the details described, instead, the invention can be practiced with modifications and alterations within the spirit and scope of the appended claims. The description is thus to be regarded as illustrative instead of restrictive on the invention.

Thus, an improved way of generating and maintaining associations between identifiers and geometry pieces of a mechanical design is facilitated, including automatic modification of leader termination on the mechanical design is disclosed.

What is claimed is:

1. A computer implemented method, comprising:
   displaying a visual representation of a geometry piece in a computer aided design (CAD) environment;
   displaying a visual representation of an identifier, the identifier having been associated with the geometry piece in the CAD environment;
   while the geometry piece and the associated identifier are simultaneously displayed, receiving a user input selecting or deselecting one of the geometry piece and the associated identifier;
   in response to the user input, determining if the user input is for selecting or deselecting one of the geometry piece and the associated identifier, and if a visual indication of an association is present between the geometry piece and the associated identifier;
   if it is determined that the received user input is for selecting one of the geometry piece and the associated identifier and that no visual indication of an association is present between the geometry piece and the associated identifier, displaying a leader connecting the geometry piece and the associated identifier in response to the received user input; and
   if it is determined that the received user input is for deselecting one of the geometry piece and the associated identifier and that a visual indication of an association is present between the geometry piece and the associated identifier, undisplaying a leader connecting the geometry piece and the associated identifier in response to the received user input while the geometry piece and the associated identifier remain simultaneously displayed.

2. The computer implemented method of claim 1, further comprising:
   receiving a second user input moving one of the identifier and the geometry piece to a new location in the CAD environment; and
   continually generating and displaying a modified leader connecting the displayed identifier and the displayed geometry piece during the move.

3. The computer implemented method of claim 1, where receiving the user input selecting or deselecting one of the displayed identifier and the displayed geometry piece comprises:
   determining whether a location specified by the user input is within a predetermined proximity to at least one of the identifier and the geometry piece.

4. The computer implemented method of claim 1, where:
   the leader is one of a line, a curve, an arrow, a polygon, or a three-dimensional graphical object.

5. The computer implemented method of claim 1, where the leader connecting the displayed identifier and the displayed geometry piece represents a closest approach between the displayed identifier and the displayed geometry piece.

6. The computer implemented method of claim 1, where the leader connecting the displayed identifier and the displayed geometry piece represents a closest approach between the displayed identifier and the displayed geometry piece that avoids obscuring a second geometry piece or identifier present in the CAD environment.

7. A computer-readable medium having stored thereon instructions, which, when executed by a processor, causes the processor to perform operations comprising:
   displaying a visual representation of a geometry piece in a computer aided design (CAD) environment;
   displaying a visual representation of an identifier, the identifier having been associated with the geometry piece in the CAD environment;
   while the geometry piece and the associated identifier are simultaneously displayed, receiving a user input selecting or deselecting one of the geometry piece and the associated identifier;
   in response to the user input, determining if the user input is for selecting or deselecting one of the geometry piece and the associated identifier, and if a visual indication of an association is present between the geometry piece and the associated identifier;
   if it is determined that the received user input is for selecting one of the geometry piece and the associated identifier and that no visual indication of an association is present between the geometry piece and the associated identifier, displaying a leader connecting the geometry piece and the associated identifier in response to the received user input; and
   if it is determined that the received user input is for deselecting one of the geometry piece and the associated identifier and that a visual indication of an association is present between the geometry piece and the associated identifier, undisplaying a leader connecting the geometry piece and the associated identifier in response to the received user input while the geometry piece and the associated identifier remain simultaneously displayed.

8. The computer-readable medium of claim 7, having stored thereon instructions, which, when executed by a processor, causes the processor to perform operations further comprising:
   receiving a second user input moving one of the identifier and the geometry piece to a new location in the CAD environment; and
   continually generating and displaying a modified leader connecting the displayed identifier and the displayed geometry piece during the move.

9. The computer-readable medium of claim 7, where receiving the user input selecting or deselecting one of the displayed identifier and the displayed geometry piece comprises:
   determining whether a location specified by the user input is within a predetermined proximity to at least one of the identifier and the geometry piece.

10. The computer-readable medium of claim 7, where:
    the leader is one of a line, a curve, an arrow, a polygon, or a three-dimensional graphical object.

11. The computer-readable medium of claim 7, where the leader connecting the displayed identifier and the displayed geometry piece represents a closest approach between the displayed identifier and the displayed geometry piece.

12. The computer-readable medium of claim 7, where the leader connecting the displayed identifier and the displayed geometry piece represents a closest approach between the displayed identifier and the displayed geometry piece that avoids obscuring a second geometry piece or identifier present in the CAD environment.

13. A system, comprising:
    a display;
    one or more processors;
    memory; and
    one or more programs, wherein the one or more programs are stored in the memory and configured to be executed by the one or more processors, the one or more programs including:
       instructions for displaying a visual representation of a geometry piece in a computer aided design environment;
       instructions for displaying a visual representation of an identifier, the identifier having been associated with the geometry piece in the CAD environment;
       instructions for while the geometry piece and the associated identifier are simultaneously displayed, receiving a user input selecting or deselecting one of the geometry piece and the associated identifier;
       instructions for, in response to the user input, determining if the user input is for selecting or deselecting one of the geometry piece and the associated identifier, and if a visual indication of an association is present between the geometry piece and the associated identifier;
       instructions for, if it is determined that the received user input is for selecting one of the geometry piece and the associated identifier and that no visual indication of an association is present between the geometry piece and the associated identifier, displaying a leader connecting the geometry piece and the associated identifier in response to the received user input; and
       instructions for, if it is determined that the received user input is for deselecting one of the geometry piece and the associated identifier and that a visual indication of an association is present between the geometry piece and the associated identifier, undisplaying a leader connecting the geometry piece and the associated identifier in response to the received user input while the geometry piece and the associated identifier remain simultaneously displayed.

14. The system of claim 13, where the one or more programs further includes:
    instructions for receiving a second user input moving one of the identifier and the geometry piece to a new location in the CAD environment; and
    instructions for continually generating and displaying a modified leader connecting the displayed identifier and the displayed geometry piece during the move.

15. The system of claim 13, where receiving the user input selecting or deselecting one of the displayed identifier and the displayed geometry piece comprises:
    determining whether a location specified by the user input is within a predetermined proximity to at least one of the identifier and the geometry piece.

16. The system of claim 13, where:
    the leader is one of a line, a curve, an arrow, a polygon, or a three-dimensional graphical object.

17. The system of claim 13, where the leader connecting the displayed identifier and the displayed geometry piece represents a closest approach between the displayed identifier and the displayed geometry piece.

18. The system of claim 13, where the leader connecting the displayed identifier and the displayed geometry piece represents a closest approach between the displayed identifier and the displayed geometry piece that avoids obscuring a second geometry piece or identifier present in the CAD environment.

* * * * *

UNITED STATES PATENT AND TRADEMARK OFFICE
CERTIFICATE OF CORRECTION

| | |
|---|---|
| PATENT NO. | : 7,620,904 B1 |
| APPLICATION NO. | : 10/177819 |
| DATED | : November 17, 2009 |
| INVENTOR(S) | : Kenneth L. Davis et al. |

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 U.S.C. 154(b) by 379 days.

Delete the phrase "by 379 days" and insert -- by 715 days --

Signed and Sealed this

Tenth Day of August, 2010

David J. Kappos
*Director of the United States Patent and Trademark Office*